United States Patent
Swidowski et al.

(10) Patent No.: US 10,417,030 B2
(45) Date of Patent: Sep. 17, 2019

(54) APPARATUS AND METHOD FOR COMPILE TIME CONSTRUCTION OF MEMORY STRUCTURES

(71) Applicant: Samsung Electronics Co., Ltd., Suwon-si, Gyeonggi-do (KR)

(72) Inventors: Kirk R Swidowski, Manteca, CA (US); Ahmed M Azab, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 15/053,486

(22) Filed: Feb. 25, 2016

(65) Prior Publication Data

US 2016/0253183 A1    Sep. 1, 2016

Related U.S. Application Data

(60) Provisional application No. 62/126,016, filed on Feb. 27, 2015.

(51) Int. Cl.
*G06F 9/44* (2018.01)
*G06F 9/455* (2018.01)
*G06F 9/4401* (2018.01)

(52) U.S. Cl.
CPC ........ *G06F 9/45558* (2013.01); *G06F 9/4401* (2013.01); *G06F 2009/45583* (2013.01); *G06F 2212/152* (2013.01); *G06F 2212/657* (2013.01)

(58) Field of Classification Search
CPC .......................... G06F 9/45558; G06F 9/4401
See application file for complete search history.

(56) References Cited

U.S. PATENT DOCUMENTS

| | | | |
|---|---|---|---|
| 2013/0111202 A1* | 5/2013 | Zeng | G06F 9/4401 713/2 |
| 2014/0122854 A1* | 5/2014 | Kato | G06F 9/4418 713/1 |
| 2016/0246732 A1* | 8/2016 | Shanbhogue | G06F 12/1036 |

* cited by examiner

*Primary Examiner* — Albert Wang
(74) *Attorney, Agent, or Firm* — Jefferson IP Law, LLP

(57) ABSTRACT

An apparatus and method for reducing boot time of an electronic device are provided. The electronic device includes electronic device is provided. The electronic device includes a processor including at least one system register; and an Operating System (OS) including an OS component having at least one reserved area, each reserved area including a static memory structure. The OS component is configured to, during a booting process, copy addresses of the at least one static memory structure into at least one of the plurality of system registers, and initialize the static memory structures located at the copied addresses.

12 Claims, 5 Drawing Sheets

APPARATUS AND METHOD FOR COMPILE TIME CONSTRUCTION OF MEMORY STRUCTURES

CROSS-REFERENCE TO RELATED APPLICATION(S)

This application claims the benefit under 35 U.S.C. § 119(e) of a U.S. Provisional application filed on Feb. 27, 2015 in the U.S. Patent and Trademark Office and assigned Ser. No. 62/126,016, the entire disclosure of which is hereby incorporated by reference.

TECHNICAL FIELD

The present disclosure relates to an apparatus and method for improving boot times in devices. More particularly, the present disclosure relates to an apparatus and method for improving boot times in devices by caching memory structures.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

When a device, such as a mobile device, boots up, the device performs a series of operations to start up the device's components, initialize the device, and prepare the device for operation. Exemplary boot-time operations include probing the device to determine the device's capabilities, constructing compatible memory structures, and writing these structures into the system (e.g., volatile memory). An example structure that the device creates during the booting process is the page tables, which are used for virtual memory management. The paging tables map a virtual memory address used by an application to a corresponding location in physical memory.

The paging tables are typically one of the more complicated data structures, and are constructed during each boot. For example, a four-level paging system may have 512 descriptors of eight bytes: nine address bits at each level plus overhead for settings, output address, permissions, memory attributes, and type. Each page table is therefore 4 KB large, which means that the entire paging system, including each of the paging tables, takes up 8 MB of space. This 8 MB paging system is generally reconstructed during each boot.

During the booting process, the device's components may operate at a limited level. For example, the processor may run at a slower clock rate, and various system caches may be unavailable. As a result, the construction of structures, such as the page tables, may take some time, thereby increasing the time needed for booting the device. While the performance impact may be limited on large scale systems, the impact may be much larger for smaller systems, such as mobile devices or embedded devices, or for systems where increased up-time is an important or necessary feature, such as real-time systems or mission-critical systems.

Accordingly, there is a need for an apparatus and method for providing an improved booting process.

SUMMARY

Aspects of the present disclosure are to address at least the above-mentioned problems and/or disadvantages and to provide at least the advantages described below. Accordingly, an aspect of the present disclosure is to provide an apparatus and method for improving boot time in devices.

In accordance with an aspect of the present disclosure, a method for reducing boot time of an electronic device is provided. The method includes prebuilding at least one static data structure during a compiling process, and patching the at least one static data structure into a corresponding reserved area of an Operating System (OS) component.

In accordance with another aspect of the present disclosure, an electronic device is provided. The electronic device includes a processor including at least one system register; and an Operating System (OS) including an OS component having at least one reserved area, each reserved area including a static memory structure, wherein the OS component is configured to, during a booting process, copy addresses of the at least one static memory structure into at least one of the plurality of system registers, and initialize the static memory structures located at the copied addresses.

In accordance with another aspect of the present disclosure, a non-transitory computer readable medium is provided. The non-transitory computer readable medium stores instructions that, when executed, cause at least one processor to perform a method. The method includes executing an Operating System (OS) component having stored therein at least one static memory structure, copying addresses of the at least one static memory structure into system registers of a processor of an electronic device, and initializing the static memory structures located at the copied addresses.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
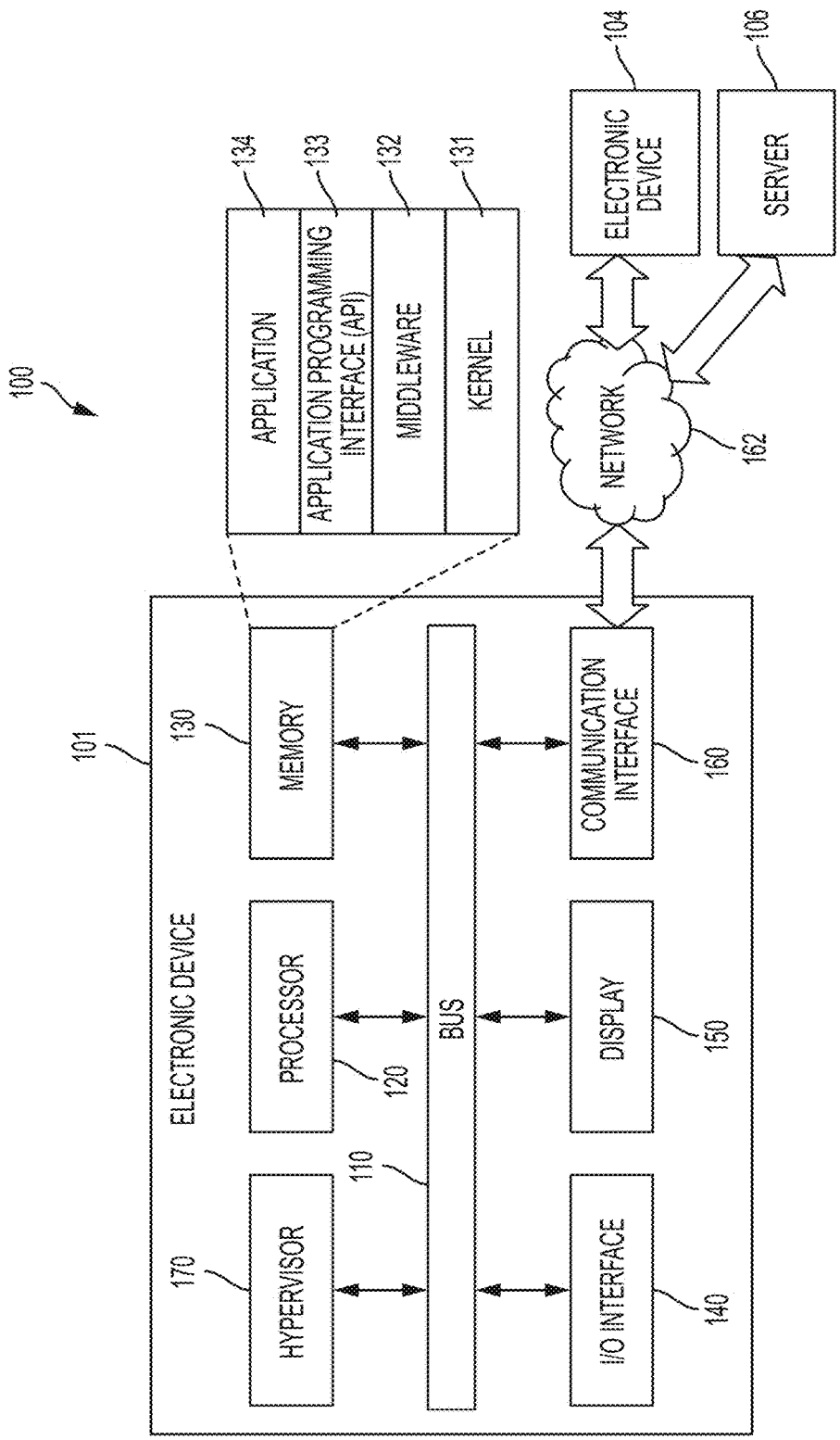
FIG. 1 illustrates a network environment including an electronic device according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the present disclosure are provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an Input/Output (I/O) interface 140, a display 150, a communication interface 160, a hypervisor 170, and/or the like.

The bus 110 may be circuitry that connect the foregoing components and allow communication between the foregoing components. For example, the bus 110 may connect components of the electronic device 101 so as to allow control messages and/or other information to be communicated between the connected components.

The processor 120 may, for example, receive instructions from other components (e.g., the memory 130, the I/O interface 140, the display 150, the communication interface 160, the hypervisor 170, and/or the like), interpret the received instructions, and execute computation or data processing according to the interpreted instructions. The processor may also include one or more system registers.

The memory 130 may, for example, store instructions and/or data that are received from, and/or generated by, other components (e.g., the memory 130, the I/O interface 140, the display 150, the communication interface 160, the hypervisor 170, and/or the like). For example, the memory 130 may include programming modules such as a kernel 131, a middleware 132, an Application Programming Interface (API) 133, an application 134, and/or the like. Each of the foregoing programming modules may include a combination of at least two of software, firmware, or hardware.

The memory 130 may also be accessed by the hypervisor 170 (or other OS component) using a technique called virtual memory (not shown). Virtual memory enables each application running on the electronic device 101 to view the memory 130, or a portion of the memory 130 allocated to the application, as a single contiguous address space, even where the actual data is stored in separate memory addresses or on persistent storage, such as hard disk drive, as opposed to a volatile memory (e.g., Random Access Memory (RAM)). The hypervisor 170 controls the mapping of the virtual addresses used by the applications to the physical address of the corresponding data in the memory 130 using one or more paging tables.

The hypervisor 170 refers to the paging tables to obtain a physical address of a corresponding virtual memory address. The paging tables may have one or more levels. Each level addresses a memory region having a successively smaller size; for example, a first-level table may address a 1 GB region of memory, a second-level table may address a 2 MB region of memory, and a third-level table may address a 4 KB memory page in physical memory. Other arrangements are also possible. Depending on the architecture, paging systems may include fewer levels (e.g., 2 or 3), and may describe different amounts of memory. A virtual memory address may therefore include an index into each of these tables, as well as other settings, such as output address, permissions, memory attributes, and type.

The kernel 131 may control or manage system resources (e.g., the bus 110, the processor 120, the memory 130, and/or the like) that may be used in executing operations or functions implemented in other programming modules such as, for example, the middleware 132, the API 133, the application 134, and/or the like. The kernel 131 may provide an interface for allowing or otherwise facilitating the middleware 132, the API 133, the application 134, and/or the like, to access individual components of the electronic device 101. According to another exemplary embodiment of the present disclosure the kernel 131 may perform some or all of the functions of the hypervisor 170.

The middleware 132 may be a medium through which the kernel 131 may communicate with the API 133, the application 134, and/or the like to send and receive data. The middleware 132 may control (e.g., scheduling, load balancing, and/or the like) work requests by one or more applications 134. For example, the middleware 132 may control work requests by one or more applications 134 by assigning priorities for using system resources (e.g., the bus 110, the processor 120, the memory 130, and/or the like) of the electronic device 101 to the one or more applications 134.

The API 133 may be an interface that may control functions that the application 134 may provide at the kernel 131, the middleware 132, and/or the like. For example, the API 133 may include at least an interface or a function (e.g., command) for file control, window control, video processing, character control, and/or the like.

According to various embodiments of the present disclosure, the application 134 may include a Short Message Service (SMS) application, a Multimedia Messaging Service (MMS) application, an email application, a calendar application, an alarm application, a health care application (e.g., an exercise amount application, a blood sugar level measuring application, and/or the like), an environmental information application (e.g., an application that may provide atmospheric pressure, humidity, temperature information, and/or the like), an instant messaging application, a call application, an internet browsing application, a gaming application, a media playback application, an image/video capture application, a file management application, and/or the like. The application 134 may be an application that is associated with information exchange between the electronic device 101 and an external electronic device (e.g., electronic device 104). As an example, the application 134 that is associated with the information exchange may include a notification relay application that may provide the external electronic device with a certain type of information, a device management application that may manage the external electronic device, and/or the like.

The notification relay application may include a functionality that provides notification generated by other applications at the electronic device 101 (e.g., the SMS/MMS application, the email application, the health care application, the environmental information application, the instant messaging application, the call application, the internet browsing application, the gaming application, the media playback application, the image/video capture application, the file management application, and/or the like) to an external electronic device (e.g., the electronic device 104). In addition to or as an alternative to, the notification relay application may provide, for example, receive notification from an external electronic device (e.g., the electronic device 104), and may provide the notification to a user.

The device management application may manage enabling or disabling of functions associated with least a portion of an external electronic device (e.g., the external electronic device itself, or one or more components of the external electronic device) in communication with the electronic device 101, controlling of brightness (or resolution) of a display of the external electronic device, an application operated at, or a service (e.g., a voice call service, a messaging service, and/or the like) provided by, the external electronic device, and/or the like.

According to various embodiments of the present disclosure, as an example, the application 134 may include one or more applications that are determined according to a property (e.g., type of electronic device, and/or the like) of the external electronic device (e.g., the electronic device 104). For example, if the external electronic device is an mp3 player, the application 134 may include one or more applications related to music playback. As another example, if the external electronic device is a mobile medical device, the application 134 may be a health care-related application. According to various embodiments of the present disclosure, the application 134 may include at least one of an application that is preloaded at the electronic device 101, an application that is received from an external electronic device (e.g., the electronic device 104, a server 106, and/or the like), and/or the like.

The I/O interface 140 may, for example, receive instruction and/or data from a user. The I/O interface 140 may send the instruction and/or the data, via the bus 110, to the processor 120, the memory 130, the communication interface 160, the hypervisor 170, and/or the like. For example, the I/O interface 140 may provide data associated with user input received via a touch screen to the processor 120. The I/O interface 140 may, for example, output instructions and/or data received via the bus 110 from the processor 120, the memory 130, the communication interface 160, the hypervisor 170, and/or the like, via an I/O device (e.g., a speaker, a display, and/or the like). For example, the I/O interface 140 may output voice data (e.g., processed using the processor 120) via a speaker.

The display 150 may display various types of information (e.g., multimedia, text data, and/or the like) to the user. As an example, the display 150 may display a Graphical User Interface (GUI) with which a user may interact with the electronic device 101.

The communication interface 160 may provide communication between the electronic device 101 and one or more external electronic devices (e.g., the electronic device 104, the server 106, and/or the like). For example, the communication interface 160 may communicate with the external electronic device by establishing a connection with a network 162 using wireless or wired communication. As an example, wireless communication with which the communication interface 160 may communicate may be at least one of, Wi-Fi, Bluetooth, Near Field Communication (NFC), Global Positioning System (GPS), cellular communication (e.g., Long Term Evolution (LTE), LTE Advanced (LTE-A), Code Division Multiple Access (CDMA), Wideband-CDMA (WDCMA), Universal Mobile Telecommunications System (UMTS), Wireless Broadband (WiBro), Global System for Mobile Communications (GSM), and/or the like), Infrared Data Association (IrDA) technology, and/or the like. As an example, wired communication with which the communication interface 160 may communicate may be at least one of, for example, Universal Serial Bus (USB), High Definition Multimedia Interface (HDMI), Recommended Standard 232 (RS-232), Plain Old Telephone Service (POTS), Ethernet, and/or the like.

According to various embodiments of the present disclosure, the network 162 may be a telecommunications network. As an example, the telecommunications network may include at least one of a computer network, the Internet, the Internet of Things, a telephone network, and/or the like. According to various embodiments of the present disclosure, a protocol (e.g., a transport layer protocol, a data link layer protocol, a physical layer protocol, and/or the like) for communicating between the electronic device 101 and an external electronic device may be supported by, for example, at least one of the application 134, the API 133, the middleware 132, the kernel 131, the communication interface 160, and/or the like.

The hypervisor 170 executes on the processor 120 and controls operations of the electronic device 101. The hypervisor may operate as part of the kernel 131 or on a lower layer than the kernel 131, and control the operations of the middleware 132, the API 133, and the applications 134. The hypervisor 170 manages one or more paging tables to control the device's virtual memory.

According to an exemplary embodiment of the present disclosure, the hypervisor 170 may manage two paging systems: one paging system for the hypervisor, and another paging system for other applications running at lower privileges. However, the type and number of paging systems may vary according to the device and system being used. These paging systems are static in that the paging systems do not change on booting the system. In addition, other OS components or applications may also manage paging systems or page tables for their own purposes.

According to the related art, the hypervisor reconstructs the paging tables during each boot. However, because the paging systems (and paging tables) do not change from boot to boot, reconstructing the same system during each boot is inefficient and contributes to long boot times. Accordingly, exemplary embodiments of the present disclosure include a hypervisor in which the paging systems are pre-constructed. As a result, the hypervisor 170 need only load these pre-existing tales into memory during boot instead of reconstructing the paging tables from scratch each boot. Exemplary operations and constructions of the hypervisor 170 are described below with respect to FIGS. 2A, 2B, 3A, and 3B.

Various embodiments of the present disclosure are described below with respect to the hypervisor 170, but this is merely an example. According to other aspects of the present invention, a different OS component may be used. For example, in an OS that does not employ a hypervisor, a kernel (e.g., the kernel 131) may be constructed to include the reserved areas as described in FIG. 2A, and the kernel, instead of the hypervisor, may perform the operations described in FIG. 2B. Additional components may also be used, and aspects of the present disclosure are not limited to a hypervisor alone.

Figure 2A:
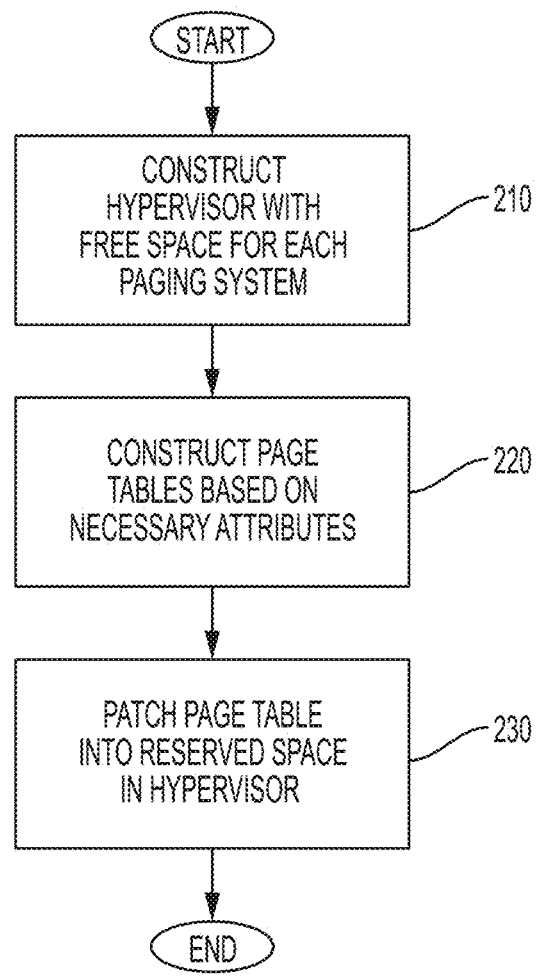
FIG. 2A is a flowchart of a method of constructing a hypervisor according to an embodiment of the present disclosure.
Figure 3A:
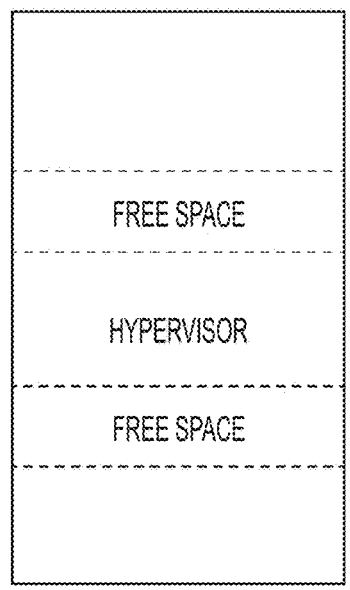
FIGS. 3A and 3B illustrate a construction of a hypervisor according to various embodiments of the present disclosure.
Figure 3B:
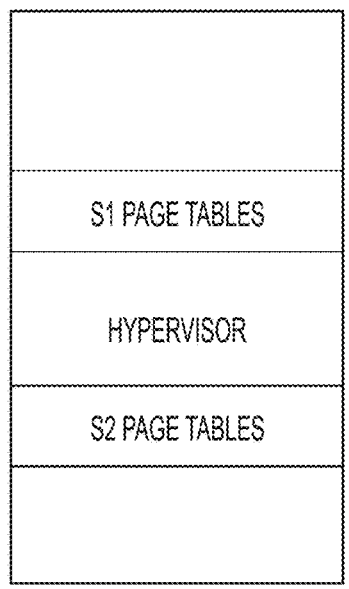

FIG. 2A is a flowchart of a method of constructing a hypervisor according to an embodiment of the present disclosure, and FIGS. 3A and 3B illustrate a construction of a hypervisor according to various embodiments of the present disclosure.

Referring to FIG. 2A, at operation 210, a compiler or server generates (e.g., constructs or compiles) the hypervisor 170 (or other OS component, such as the kernel 131) and reserves space for each paging table within the hypervisor. The amount of space reserved may vary according to the number and size of the paging tables to be inserted into the hypervisor 170. For example, if a first paging system is 32 KB and a second paging system is 24 KB, the compiler may generate the hypervisor 170 to have two reserved areas: a 32 KB space for the first paging system and a 24 KB space for the second paging system. These reserved areas may be located in contiguous or non-contiguous regions of the hypervisor 170. FIG. 3A shows an example of the hypervisor after operation 210.

At operation 220, the compiler constructs the paging tables. The server may construct the tables based on required memory map attributes. The page tables may be allocated from a contiguous block of memory. To construct the paging tables, the server may execute a specific application programmed to create the appropriate structures and descriptors for the paging tables.

At operation 230, the compiler (or the application executed in operation 220) opens the hypervisor 170 (or other OS component) and patches the constructed paging tables into the corresponding reserved areas. For example, in the case of ELF files, a set of labels may be exported that enable to compiler to identify the reserved areas of the hypervisor 170.

The compiler may repeat operations 210, 220, and 230 for each set of page tables to be inserted into the hypervisor 170. Alternatively, the compiler may operate on all of the page tables at once.

According to another embodiment of the present disclosure, operations 210, 220, and 230 may be performed by the device during an initial boot of the device.

FIG. 3B shows an example of the hypervisor after operation 230 is performed for all of the paging tables. In FIG. 3B, each of the paging tables has been inserted into the reserved area of the hypervisor. At this point, the server may install the hypervisor 170 onto the target electronic device. In the case of initial installation, the installation may occur at the device manufacturer. If the system software is being updated, the hypervisor 170 may also need to be updated, including constructing new paging tables. In this case, the server may download the updated hypervisor 170 to an electronic device via a firmware over-the-air (FOTA) update.

Figure 2B:
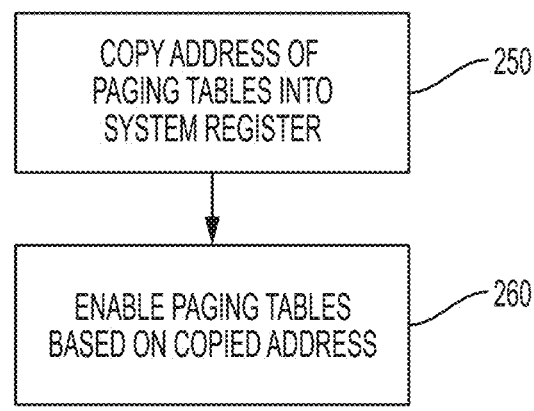
FIG. 2B is a flowchart of a method of booting a mobile device according to an embodiment of the present disclosure.

FIG. 2B is a flowchart of a method of booting a mobile device according to an embodiment of the present disclosure.

Referring to FIG. 2B, in contrast to operations 210 to 230, operations 250 and 260 are performed by the hypervisor 170 during booting of the electronic device. At the start of the boot process, the electronic device is in a substantially uninitialized state. When the hypervisor 170 begins executing, most optimizations are disabled, caches are disabled, and the memory management units are turned off. During the boot process, the hypervisors enables each of these functions. According to exemplary embodiments of the present disclosure, the hypervisor 170 speeds up the booting process by referring to pre-constructed paging tables instead of reconstructing the paging tables each boot.

In operation 250, the hypervisor 170 copies the address of the paging tables into system registers of the processor (e.g., the processor 120). In the case of an Advanced RISC Machine (ARM) processor, the system registers may be TTBR0_EL1 or VTTBR (which is a register assigned to a virtualization table).

In operation 260, the hypervisor 170 enables the paging tables based on the copied addresses. For example, the hypervisor 170 may copy the paging tables at the identified addresses into volatile memory. Once the paging tables have been initialized, the booting process continues. By utilizing the static paging tables, instead of allocating tables and populating the tables with the appropriate descriptors, the time taken to construct the paging system in an ARM device, such as the Samsung™ Galaxy™ Note 4, may be reduced from around 3 seconds to around 100 milliseconds, which in turn reduces the overall boot time.

Although operations 250 and 260 are described in the context of a booting process, exemplary embodiments of the present disclosure may also be applied to other restoration processes. For example, the operations could be performed when the electronic device is recovering from hibernation.

Figure 4:
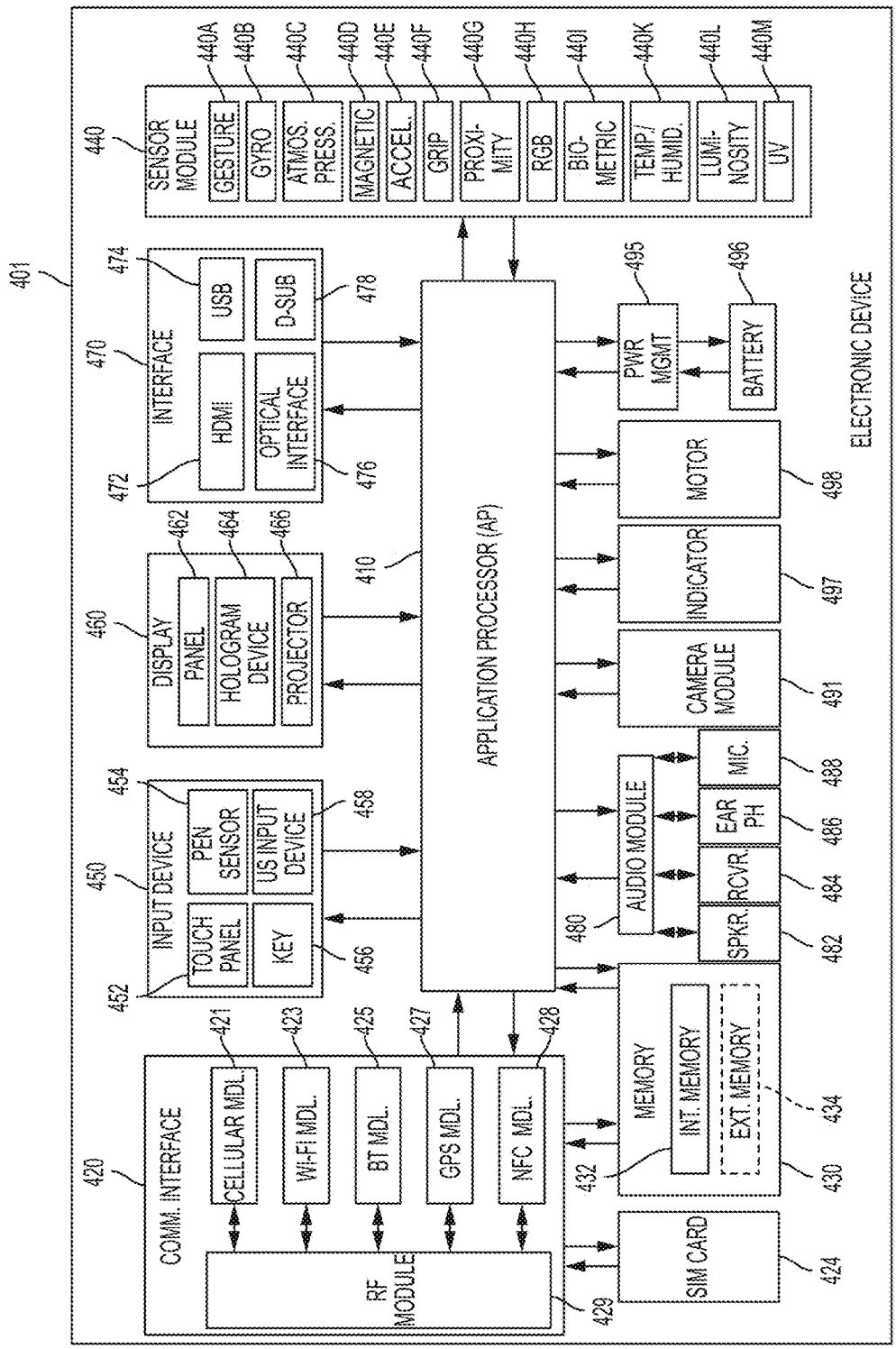
FIG. 4 illustrates a block diagram of hardware according to various embodiments of the present disclosure.

FIG. 4 illustrates a block diagram of hardware according to various embodiments of the present disclosure.

Referring to FIG. 4, an electronic device 401 may be, for example, a part of or the entire electronic device 101. The electronic device 401 may include one or more Application Processors (AP) 410, a communication module 420, a Subscriber Identification Module (SIM) card 424, a memory 430, a sensor module 440, an input module 450, a display module 460, an interface 470, an audio module 480, a camera module 491, a power management module 495, a battery 496, an indicator 497, a motor 498, and/or the like.

The AP 410 may control one or more hardware or software components that are connected to AP 410, perform processing or computation of data (including multimedia data), and/or the like. As an example, the AP 410 may be implemented as a System-on-Chip (SoC). The AP 410 may include a Graphics Processing Unit (GPU) (not shown). The AP 410 may also include the system registers where the hypervisor 170 copies the addresses of the paging tables during the booting process.

The communication module 420 (e.g., the communication interface 160) may transmit and receive data in communications between the electronic device 101 and other electronic devices (e.g., the electronic device 104, the server 106, and/or the like). As an example, the communication module 420 may include one or more of a cellular module 421, a Wi-Fi module 423, a Bluetooth module 425, a GPS module 427, a NFC module 428, a Radio Frequency (RF) module 429, and/or the like.

The cellular module 421 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 421 may differentiate and authorize electronic devices within a communication network using a Subscriber Identification Module (SIM) card (e.g., the SIM card 424). According to various embodiments of the present disclosure, the cellular module 421 may perform at least a part of the functionalities of the AP 410. For example, the cellular module 421 may perform at least a part of multimedia control functionality.

According to various embodiments of the present disclosure, the communication interface 420 and/or the cellular module 421 may include a Communication Processor (CP). As an example, the cellular module 421 may be implemented as SoC.

Although FIG. 4 illustrates components such as the cellular module 421 (e.g., CP), the memory 430, the power management module 495 as components that are separate from the AP 410, according to various embodiments of the present disclosure, the AP 410 may include, or be integrated with, one or more of the foregoing components (e.g., the cellular module 421).

According to various embodiments of the present disclosure, the AP 410, the cellular module 421 (e.g., CP), and/or the like, may process instructions or data received from at least one of non-volatile memory or other components by loading in volatile memory. The AP 410, the cellular module 421, the communication interface 420, and/or the like, may store at non-volatile memory at least one of data that is received from at least one of other components or data that is generated by at least one of the other components.

Each of the Wi-Fi module 423, the Bluetooth module 425, the GPS module 427, the NFC module 428, and/or the like may, for example, include one or more processors that may process data received or transmitted by the respective modules. Although FIG. 4 illustrates the cellular module 421, the Wi-Fi module 423, the Bluetooth module 425, the GPS module 427, and the NFC module 428 as separate blocks, according to various embodiments of the present disclosure, any combination (e.g., two or more) of the cellular module 421, the Wi-Fi module 423, the Bluetooth module 425, the GPS module 427, the NFC module 428, and/or the like may be included in an Integrated Chip (IC) or an IC package. For example, at least some of the processors corresponding to the respective the cellular module 421, the Wi-Fi module 423, the Bluetooth module 425, the GPS module 427, the NFC module 428, and/or the like, may be implemented as a single SoC. For example, a CP corresponding to the cellular module 421 and a Wi-Fi processor corresponding to Wi-Fi module 423 may be implemented as a single SoC.

The RF module 429 may, for example, transmit and receive RF signals. Although not shown, the RF module 429 may include a transceiver, a Power Amp Module (PAM), a frequency filter, a Low Noise Amplifier (LNA), and/or the like. The RF module 434 may include one or more components for transmitting and receiving Electro-Magnetic (EM) waves (e.g., in free space or the like) such as, for example, conductors or conductive wires. Although FIG. 4 illustrates that the cellular module 421, the Wi-Fi module 423, the Bluetooth module 425, the GPS module 427, and the NFC module 424 are sharing one RF module 429, according to various embodiments of the present disclosure, at least one of the cellular module 421, the Wi-Fi module 423, the Bluetooth module 425, the GPS module 427, the NFC module 428, and/or the like may transmit and receive RF signals via a separate RF module.

The SIM card 424 may be a card implementing a SIM, and may be configured to be inserted into a slot disposed at a specified location of the electronic device. The SIM card 424 may include a unique identifier (e.g., Integrated Circuit Card IDentifier (ICCID)) subscriber information (e.g., International Mobile Subscriber Identity (IMSI)), and/or the like.

The memory 430 (e.g., memory 130) may include an internal memory 432, an external memory 434, or a combination thereof.

According to various embodiments of the present disclosure, the internal memory 432 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 432 may be a Solid State Drive (SSD). As an example, the external memory 434 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 434 may be operatively coupled to electronic device 401 via various interfaces. According to various embodiments of the present disclosure, the electronic device 401 may include recording devices (or recording media) such as, for example, Hard Disk Drives (HDD), and/or the like.

The sensor module 440 may measure physical/environmental properties detect operational states associated with electronic device 401, and/or the like, and convert the measured and/or detected information into signals such as, for example, electric signals or electromagnetic signals. As an example, the sensor module 440 may include at least one of a gesture sensor 440A, a gyro sensor 440B, an atmospheric pressure sensor 440C, a magnetic sensor 440D, an accelerometer 440E, a grip sensor 440F, a proximity sensor 440G, an RGB sensor 440H, a biometric sensor 440I, a temperature/humidity sensor 440J, a luminosity sensor 440K, a Ultra Violet (UV) sensor 440M, and/or the like. The sensor module 440 may detect the operation state of the electronic device and/or measure physical properties, and convert the detected or measured information into electrical signals. Additionally or alternatively, the sensor module 440 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 440 may also include control circuitry for controlling one or more sensors included therein.

The input module 450 may include a touch panel 452, a (digital) pen sensor 454, a key 456, an ultrasonic input device 458, and/or the like.

As an example, the touch panel 452 may detect touch input using capacitive, resistive, infrared, ultrasonic methods, and/or the like. The touch panel 452 may also include a touch panel controller (not shown). As an example, a capacitive-type touch panel may detect proximity inputs (e.g. hovering input) in addition to, or as an alternative to, physical touch inputs. The touch panel 452 may also include a tactile layer. According to various embodiments of the present disclosure, the touch panel 452 may provide haptic feedback to the user using the tactile layer.

The (digital) pen sensor 454 may be implemented using methods identical to or similar to receiving a touch input from a user, or using a separate detection sheet (e.g., a digitizer).

The key 456 may be a keypad, a touch key, and/or the like.

The ultrasonic input device 458 may be a device configured to identify data by detecting, using a microphone (e.g., microphone 488), ultrasonic signals generated by a device capable of generating the ultrasonic signal. The ultrasonic input device 458 may detect data wirelessly.

According to various embodiments of the present disclosure, the electronic device 401 may receive user input from an external device (e.g., a network, computer or server) connected to the electronic device 401 using the communication module 420.

The display module 460 (e.g., display 150) may include a panel 462, a hologram device 464, a projector 466, and/or the like. The panel 462 may be, for example, a Liquid-Crystal Display (LCD), an Active-Matrix Organic Light-Emitting Diode (AM-OLED) display, and/or the like. As an example, the panel 462 may be configured to be flexible, transparent, and/or wearable. The panel 462 and the touch panel 452 may be implemented as a single module. The hologram device 464 may provide a three-dimensional image. For example, the hologram device 464 may utilize the interference of light waves to provide a three-dimensional image in empty space. The projector 466 may provide image by projecting light on a surface (e.g., a wall, a screen, and/or the like). The surface may be positioned internal or external to electronic device 401. According to various embodiments of the present disclosure, the display module 460 may also include a control circuitry for controlling the panel 462, the hologram device 464, the projector 466, and/or the like.

The interface 470 may include, for example, one or more interfaces for a High-Definition Multimedia Interface (HDMI) 472, a Universal Serial Bus (USB) 474, a projector 476, or a D-subminiature (D-sub) 478, and/or the like. As an example, the interface 470 may be part of the communication interface 420. Additionally or alternatively, the interface 470 may include, for example, one or more interfaces for Mobile High-definition Link (MHL), Secure Digital (SD)/MultiMedia Card (MMC), Infrared Data Association (IrDA), and/or the like.

The audio module 480 may encode/decode sound into electrical signal, and vice versa. According to various embodiments of the present disclosure, at least a portion of audio module 480 may be part of the I/O interface 140. As an example, the audio module 480 may encode/decode voice information that is input into, or output from, the speaker 482, the receiver 484, the earphone 486, the microphone 488, and/or the like.

The camera module 491 may capture still images and/or video. According to various embodiments of the present disclosure, the camera module 491 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 495 may manage electrical power of the electronic device 401. Although not shown, the power management module 495 may include, for example, a Power Management Integrated Circuit (PMIC), a charger Integrated Circuit (charger IC), a battery gauge, a fuel gauge, and/or the like.

The PMIC may be disposed in an integrated circuit or an SoC semiconductor. The charging method for the electronic device 401 may include wired or wireless charging. The charger IC may charge a battery, may prevent excessive voltage or excessive current from a charger from entering the electronic device 401, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

The battery gauge may measure a charge level, a voltage while charging, a temperature of battery 496, and/or the like.

The battery 496 may supply power to the electronic device 401. The battery 496 may be a rechargeable battery, a solar battery, and/or the like.

The indicator 497 may indicate one or more states (e.g., boot status, message status, charge status, and/or the like) of the electronic device 401 or a portion thereof (e.g., AP 410). The motor 498 may convert an electrical signal into a mechanical vibration.

Although not shown, the electronic device 401 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like. Exemplary embodiments of the present disclosure may be employed in any system software, such as Android™, iOS™, Windows™, and the like. Although exemplary embodiments of the present disclosure have been described with respect to the construction of paging tables, other architectural data structures may be pre-constructed prior to boot. Examples of such data structures include memory management structures, memory mapped input/output (I/O) configurations, and other mutable and non-mutable structures that do not vary from boot to boot.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure.

Accordingly, the scope of the present disclosure should be understood as to include any and all modifications that may be made without departing from the technical spirit of the present disclosure.

What is claimed is:

1. A method of booting an electronic device, the method comprising:
    executing an Operating System (OS) component having stored therein at least one static memory structure, wherein information stored in the at least one static memory structure does not change between successive bootings of the electronic device;
    copying addresses of the at least one static memory structure into system registers of a processor of the electronic device; and
    initializing the at least one static memory structure located at the copied addresses.

2. The method of claim 1, wherein the at least one static memory structure comprises:
    a first paging table for a hypervisor, and
    a second paging table for other applications executing on the electronic device.

3. The method of claim 1, wherein the OS component is a hypervisor.

4. The method of claim 1, wherein the OS component is a kernel.

5. An electronic device comprising:
    a processor including at least one system register; and
    an Operating System (OS) including an OS component having at least one reserved area, each reserved area including a static memory structure, wherein information stored in the static memory structure does not change between successive bootings of the electronic device, and
    wherein the OS component is configured to, during a booting process:
        copy addresses of the at least one static memory structure into at least one of the at least one system register; and
        initialize the at least one static memory structure located at the copied addresses.

6. The electronic device of claim 5, wherein the at least one static memory structure comprises:
    a first paging system for a hypervisor, and
    a second paging system for other applications executing on the electronic device.

7. The electronic device of claim 6, wherein the at least one reserved area comprises:
    a first reserved area for the first paging system, and
    a second reserved area for the second paging system.

8. The electronic device of claim 5, wherein the OS component is one of a hypervisor or a kernel.

9. The electronic device of claim 5, wherein the OS component is further configured to, during an initial booting of the electronic device:
    prebuild the at least one static memory structure, and
    patch each of the at least one static memory structure into the corresponding reserved area of the at least one reserved area of the OS component.

10. A non-transitory computer-readable storage medium storing instructions that, when executed, cause at least one processor to perform a method comprising:
    executing an Operating System (OS) component having stored therein at least one static memory structure, wherein information stored in the at least one static memory structure does not change between successive bootings of the electronic device;

copying addresses of the at least one static memory structure into system registers of a processor of an electronic device; and initializing the at least one static memory structure located at the copied addresses.

11. The non-transitory computer readable storage medium of claim 10, wherein the at least one static memory structure comprises:

a first paging table for a hypervisor; and a second paging table for other applications executing on the electronic device.

12. The non-transitory computer readable storage medium of claim 10, wherein the OS component is configured to, during an initial booting of the electronic device:

prebuild the at least one static memory structure, and patch each of the at least one static memory structure into a corresponding reserved area of the OS component.

* * * * *